March 19, 1957 W. E. GARRIGUS ET AL 2,786,135

TELEVISION TUNER FOR CONTINUOUS TUNING OVER
TWO V. H. F. BANDS AND THE U. H. F. BAND

Filed Jan. 2, 1953 3 Sheets-Sheet 1

INVENTORS
WALTER E. GARRIGUS
NED C. SKILLMAN
AND CLAIRE WAINWRIGHT

BY [signature]

ATTORNEY

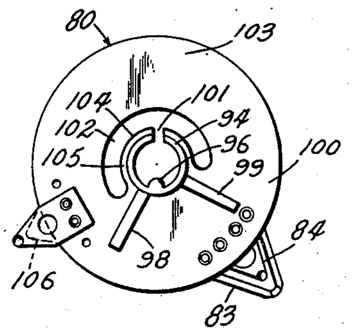
FIG. 6.
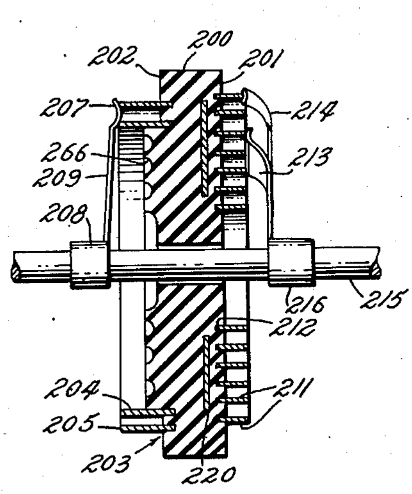
FIG. 7.
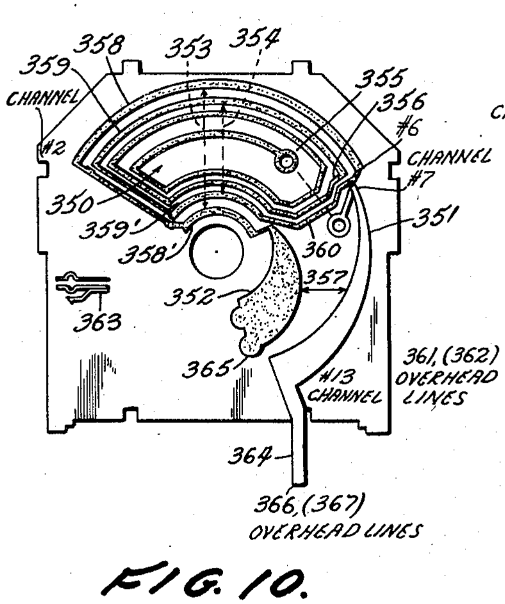
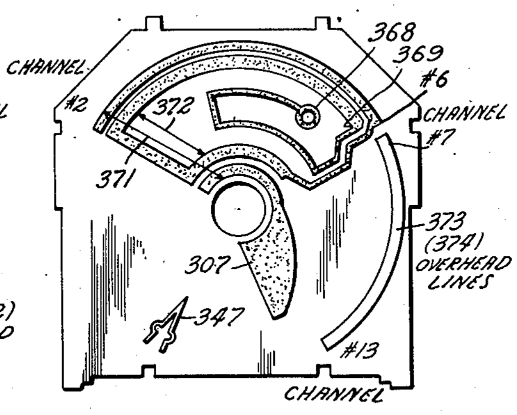
FIG. 11.
FIG. 10.
INVENTORS
WALTER E. GARRIGUS
NED C. SKILLMAN
AND CLAIRE WAINWRIGHT
BY [signature]
ATTORNEY

INVENTORS
WALTER E. GARRIGUS
NED C. SKILLMAN
AND CLAIRE WAINWRIGHT

BY [signature]

ATTORNEY

United States Patent Office 2,786,135

Patented Mar. 19, 1957

2,786,135

TELEVISION TUNER FOR CONTINUOUS TUNING OVER TWO V. H. F. BANDS AND THE U. H. F. BAND

Walter E. Garrigus, Ned C. Skillman, and Claire Wainwright, Indianapolis, Ind., assignors to P. R. Mallory & Co., Inc., Indianapolis, Ind., a corporation of Delaware Application January 2, 1953, Serial No. 329,347

2 Claims. (Cl. 250—20)

This invention relates generally to electromagnetic wave-tuning devices operable over a wide band of ultra-high-frequency ranges and has specific application to such devices including means and methods for tuning very-high and ultra-high-frequency apparatus.

The progression of the communication arts and especially the television industry has made it necessary to provide simple and inexpensive means to accept electromagnetic energy signals encompassing a range of frequencies including 470–890 megacycles. The extension of the television spectrum to cover these frequencies, moreover, has been accompanied by the requirement for providing a signal-selecting and tuning apparatus which will not only receive these ultra-high band of frequencies, but at the same time selectively tune through the band of television frequencies now presently in use, i. e. 50 megacycles to 260 megacycles.

The present invention of an ultra-high-frequency energy acceptance or tuning apparatus operates so as to selectively and continuously accept signals over bands of frequencies of electromagnetic energy ranging from 50 megacycles to 890 megacycles. The acceptance of the varying range of frequencies is accomplished herein within a radial excursion of no more than 360°. Thus the operator of said device is enabled during one rotation of the motive shaft supporting the tuning elements of said tuning device to selectively determine any frequency within the very-high and ultra-high-frequency television bands, namely, 50 to 890 megacycles. It is, therefore, an object of the present invention to provide a tuning device for operation over a wide band of very-high and ultra-high-frequencies, viz. those from 50 to 890 megacycles.

Another object of the present invention is to provide an inductive tuning device for operation over a wide range of ultra-high-frequencies, namely 470–890 megacycles.

Yet another object of the present invention is to provide an indexed tuning device continuously operable over very-high and ultra-high-frequency television bands, namely those existing between the frequencies of 50 megacycles to 890 megacycles.

Another object of the present invention is to provide a tuning device adapted to receive radio frequency signals modulated either by audio or video intelligence in both the very-high-frequency and ultra-high-frequency television bands.

Still another object of the present invention is to provide a unisurface planar type of tuning element for receiving energy continuously over a wide band of very-high and ultra-high-frequencies.

Another object of the present invention is to provide a new tuning device having excellent mechanical and electrical properties including long life, ease of operation, and freedom from noise when operated over the aforesaid very-high and ultra-high-frequency ranges of electromagnetic energy.

Still another object of the present invention is to provide tuning elements for a tuner including flat-surface conductor patterns having predetermined capacitance and inductance parameters, said patterns being applicable to a flat supporting surface whereby upon proper electrical accessories being coupled thereto, said surfaces are adapted to define and determine the frequency acceptance range of said tuning element.

Still another object of the present invention is to provide tuning elements for a tuner including a plurality of horizontally mounted flat surface conductors having predetermined capacitance and inductance parameters, said patterns being applicable to a flat supporting surface whereby upon proper electrical accessories being coupled thereto, said surfaces are adapted to define and determine the frequency acceptance range of said tuning element.

Still another object of the present invention is to provide a combined very-high-frequency and ultra-high-frequency television tuning device which accepts electromagnetic energy signals encompassing the range of 50 to 88 megacycles, 174 to 216 megacycles, and 470 to 890 megacycles, and adapted to convert the same to an intermediate band of frequencies lower in range thereto and preferably within the range of 40–45 megacycles.

Yet another object of the present invention is to provide printed elements in electrical circuits capable of operation with assorted circuitry to electrically function both as a radio frequency acceptance stage of an ultra-high-frequency tuner and as the oscillator stage locally adapted to provide a determined frequency which will beat with said frequency accepted by said "R. F." stage so as to develop an intermediate frequency therefrom adapted to be routed toward the intermediate frequency stages of associated electrical apparatus operating within a frequency area of 40–45 megacycles.

Still another object of the present invention is to provide new and novel tuning means for an ultra-high-frequency and very-high-frequency tuning system wherein the tuning elements constitute and partially include printed coils placed in planar contact with a supporting insulative base, said coils having a folded and rectangular configuration adapted to define frequency ranges initiating from 50 megacycles and maximizing at a range of about 890 megacycles.

Yet another object of the present invention is to provide a continuous very-high-frequency and ultra-high-frequency television tuner comprising several stages of radio frequency, a mixer stage, and an oscillator stage, each of said aforesaid stages having as an integral component thereof a printed inductor whose configuration substantially defines the inductance parameters of said tuner so as to define the frequency acceptance ranges thereof which allows for the acceptance of wide bands of frequencies and to ultimately convert the same to a predetermined intermediate frequency resident within the band of 40–45 megacycles.

Still another object of the present invention is to provide mechanical tuning means associated with printed circuitry, said mechanical tuning means adapted to have a radial excursion of no more than 360° and which in conjunction with said printed circuitry and associated apparatus is adapted to selectively and discretely accept signals in a continuous manner over a band ranging from 50 to 890 megacycles.

Still another object of the present invention is to provide an improved new and novel ultra-high-frequency tuner operable at pre-set ultra-high television channels included within the frequency range of 470–890 megacycles.

Still another object of the present invention is to provide a mechanical assembly for tuning a printed circuit tuning mechanism over a spectrum range of 50 to 890 megacycles.

Still another object of the present invention is to provide a new, novel and improved very-high-ultra-high-frequency tuning mechanism, a contactor element slideably rotated in relation thereto and making contact therewith, said contactor having a plurality of finger contacts each separately making contact with a portion of said tuning elements.

Another object of the present invention is to provide a novel antenna-coupling device for coupling ultra-high-frequency to said tuning device so as to optimumly receive electromagnetic radio and television signals of from 40 to 890 megacycles.

Another object of the present invention is to provide tuning means for receiving very-high and ultra-high-frequency electromagnetic energy and to convert the same for use with associated apparatus adapted to receive and transmit a frequency range of 40 to 45 megacycles.

Another object of this invention is to provide an N-terminal network forming a continuously variable inductance whose mean reactance changes suddenly "jumps" at specified points in a wide range of tunable frequencies, and wherein "N" may be two or greater, depending upon circuit configurations.

Another object of this invention is to provide complete, continuous reactance-tuning over a multiplicity of frequency bands of finite extent with a minimum angular (or translational) contact-displacement between bands, and a relatively small angular contact-displacement within each band.

Another object of this invention is to provide a mechanical assembly of variable inductances having long life, smooth operation, low contact-noise, a high degree of resettability, and positive alignment.

Still another object of this invention is to provide a very low value of minimum inductance suitable for resonating at about 890 megacycles, with capacitances of the order of 1 microfarad.

A further object of this invention is to provide a variable length of conducting labyrinth in a relatively small space, having a relatively large ratio of maximum to minimum inductance within approximately ⅓ of a complete rotation of the tuning mechanism.

A further object of this invention is to provide continuous inductive tuning in at least three separate tuning bands.

A further object of this invention is to provide a minimum of inherent and unwanted distributed parameters associated with the physical inductance of the tuning elements.

A further object of this invention is to utilize the unavoidable changes in distributed parameters at range-jump points for automatic improvement of performance.

Other objects of the invention and the nature thereof will become apparent from the following description considered in connection with the accompanying figures of the drawing, and wherein like reference characters describe elements of similar function therein and wherein the scope of the invention is to be determined rather from the appended claims.

In the drawings,

Fig. 1 is a longitudinal cross-sectional view of an embodiment of the present novel invention of a selectively indexed continuous type tuning device for very-high and ultra-high-frequencies encompassing the range of 50–88 megacycles; 174–216 megacycles; and 470–890 megacycles; and having sections comprising an antenna tuner section, a preselector section, and an oscillator tuning section, the output from which is directed toward associated intermediate frequency stages of a communication receiver;

Figs. 2 and 4 illustratively depict constructional top plan views of the individual sections used with the present novel invention, the coil configuration represented in Fig. 2 mounted on an insulative base and defining the antenna and preselector coil inductance and capacitance parameters, and Fig. 4 defining the oscillating coil inductance and capacitance parameters; the frequency range of said coils of said sections being varied by associated contactor elements represented in Fig. 2;

Fig. 6 is a plan view of the contactor assembly structure supporting the cooperative contactor brushes for wiping the tuning patterns of the present invention;

Fig. 7 is a cross-sectional view of a modification of one of the tuning sections of the present invention as adapted to illustrate the back-to-back relationship of the coils defining the ultra-high and very-high-frequency sections thereof;

Figures 8, 9:
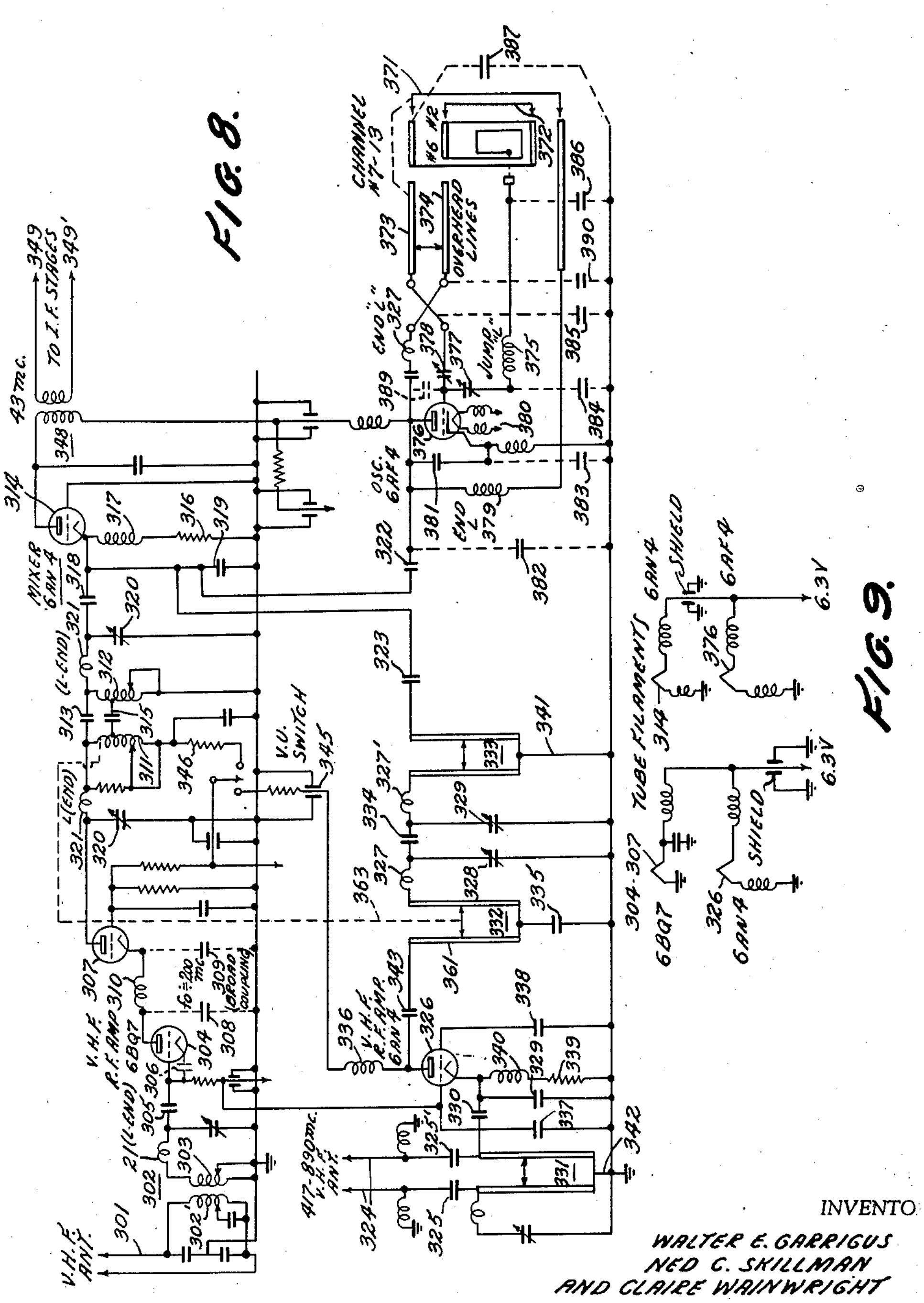

Figure 8 is an electrical schematic diagram of the very-high-ultra-high-frequency tuner adapted to receive radio frequency signals modulated either by audio or video intelligence in both the very-high-frequency and ultra-high-frequency television bands, said electrical schematic illustrating an electrical embodiment of the tuning mechanism incorporating the mechanical coil structures shown in the above figures as cooperating with associated electrical circuitry adapted to direct the necessary frequencies to the intermediate frequency stages of the television receiver;

Fig. 9 illustrates the filament or heater arrangement for the tubes in Fig. 8; and Figs. 10 and 11 are plan views of radio-frequency and oscillator tuning patterns with which the electrical and contactor arrangements may be more fully discerned and illustrated.

In the following description certain specific terms are used for convenience in referring to the various details of the invention. These terms, however, are to be interpreted in accordance with the state of the art and as understood by persons skilled in the art in their accepted mechanical and electrical sense. Accordingly, where certain expressions are condensed or abbreviated, the meanings thereof are to be taken in accordance with the usage of the said art and as understood by those skilled in the art. Moreover, the scope of the invention is to be determined in accordance with the terms of substantive equivalency as defined and generally accepted by those skilled in the art.

Generally speaking, the present invention relates to continuously variable tuning devices of the inductance type operable selectively over separate bands of frequencies comprising the frequency ranges of 50–80 megacycles; 174–216 megacycles; and 470–890 megacycles, corresponding to the channels allotted for ultra-high-frequency and very-high-frequency transmission and reception. In accordance with the invention, a plurality of ganged and variable inductors form essential components of the frequency resonators comprising the antenna section, the radio frequency or preselector section and the oscillator section. These resonators are simultaneously tracked so as to determine the acceptance frequency, the oscillator frequency and the intermediate frequencies operative in and routed through the subject tuning device.

The resonators or tuners as set forth above operate at such high comparative frequencies to those generally used heretofore that special problems and critical requirements exist relative to the materials, the form and the mode of construction of the separate elements employed in the constructing of the tuning device. The mechanical problems posited for constructing the tuning elements so as to give desired and determined electrical characteristics are greatly at variance from the correlative features known in the designing and construction of low-frequency resonators. At low frequencies, for example, electrical and mechanical tolerances available for constructing such resonators are greater since the parameters of inductance L and capacitance C are taken to be situated in one place or "lumped." This assumption is not valid at ultra- and very-high frequencies. Here the parameters of inductance and capacitance are taken to be distributed throughout the resonator and the tolerances cannot be as great as previously afforded. The length of the conductor, the shape and thickness of the conductor surface, its position with respect to associated circuitry and supporting structure, the type and design of the contactor used, and the synoptic configuration of the resonator, all become especially important in the design and construction of the ultra-high-frequencies resonator, since minute changes in any of the above factors cause critical variations in the quality, "Q," performance of the resonator.

The applicants have taken all the above factors into account and have built, designed and constructed an efficient, economical and simple, combined ultra-high and very-high-frequency resonator which provides, among other factors, optimum acceptance qualities of gain, sensitivity and resolution. A tuning element is provided for each resonator section which is similar in many respects, but which constructionally and mechanically varies in configuration in accordance with the electrical requirements of the individual resonator, i. e. whether the resonator is designed for the preselector, antenna or oscillator stage.

The individual tuner elements of the resonators comprise a flat base structure for supporting a plurality of radially and concentrically disposed flat planar conductors. These conductors are of critical and determined width, length and configuration in accordance with the inductance and capacitance requirements of the frequency band which they are to cover. The centripetal arrangement, as well as the peripheral location of the individual conductors, provides in coils or inductances of single flat turns, or several convoluted turns, the basis for continuous radial tuning of the tuning mechanism over separate bands of very-high and ultra-high-frequencies. The variation in frequency is obtained by determining the electrical length of the conductors in the coils with the use of a short-circuiting contactor assembly comprising a plurality of contact arms angularly displaced on the assembly so as to wipe the separate turns of said coils in said bands at a predetermined portion of the complete rotational cycle of no more than 360°.

The novel radial arrangement of the contact arms calls into use only such portions of the contactor assembly required to tune or resonate the individual bands of the tuning element as determined by the relationship of the conductors to said assembly.

The mechanical and physical construction of the variable tuning device or tuner 10 is shown in the drawings, more particularly Figs. 1 to 7, and is claimed in co-pending application U. S. Ser. No. 321,634. As there seen, the tuning device 10 is a compact assembly with variable inductance elements 11—16 included within a plurality of tuning sections 17—22. The tuning sections include insulative plates 23—28 at which inductance elements 11—16 are supported in a manner hereinafter described. The plates are retained in an upright manner on base plate 29 of the tuner chassis by means of leg portions such as 31, 32 (Fig. 2) fitted within accommodating cutout or slots formed out of the base plate 29. At the end opposite these leg portions plates 23—28 have extensions such as 33, 34, which, if desired, are adapted to be coupled or staked to a clamping strap so as to aid in the rigid, upright maintenance of these plates.

A series of shielding or grounding plates 36—39 are placed throughout and may be between insulative plates 23—28. These shielding or ground plates 36—39 are supported in a substantially upright manner on and are held substantially at right angles to the base plate 29 by being staked and integrally joined thereto at the junction of their bottom ends and the inner face of said base plate. At the opposite end thereof, each plate has a unitarily formed anchoring protuberance of T-shaped head configuration such as is shown in 40—43. The T head thereof penetrates a clamping strap 44 through single apertures, as at 45, formed therein. A metal canopy or dust cover 47 having side walls and a top portion fits over the interior structure such as that including the tuner sections and the shielding plates so that its sides meet with base plate 29 of the chassis in an essentially tight and dust-proof fashion. The top of the cover has counter-sunk depressions such as 48 formed thereon, with slots cut therein having an extent slightly larger than the length of the head portion of the associated anchoring protuberances of the shielding plates so that the head portions may be fitted therewithin. At the counter-sunk depressions, the clamping strap is seen to be tightly abutted against the dust cover. By merely twisting the head portion of the anchoring protuberance, the cover may be tightly juxtaposed to said anchoring strap so as to be tightly fitted over the interior assembly of the tuner. Front and back plates 52 and 53 placed at right angles to base plate 29 extend therefrom in a substantially upright manner to fit within and against integrally formed lips 55 and 56 of the cover.

The tuner, although continuously operable over frequency bands including very-high and ultra-high-frequency ranges, is indexed so as to selectively determine each of the television channels in operation. The detent or indexing mechanism 59 for selectively choosing the television channel is found within the detent section 60. This detent mechanism is contained by means of a plate 52, wall 53*a* and side walls 54 bent and extending from wall 53*a* at essentially right angles thereto in a manner so as to be firmly staked to plate 52 by means of posts integrally connected to wall 54 or by any other suitable connecting means. The detent mechanism includes means 61 for determining the rough tuning selection of the television channel and also contains means 62 for a fine adjustment within such selected channel.

Figure 2:
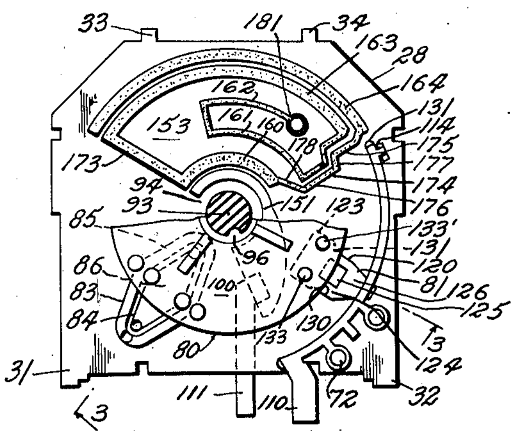
Figure 5:
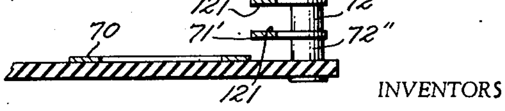
Fig. 5 is an elevational cross-sectional view of Fig. 4 taken along the line 5—5 thereof as adapted to show the line element used in conjunction with and above the planar conductor surfaces of the coils used in the separate stages of the tuner incorporating the present invention.

As stated, the inductive elements 11—16 are supported on individual insulative base plates such as 28. These inductive elements 11—16 (as shown in Figs. 2 and 5) include electrical conductors such as 70 which may be placed on, stamped on, or printed to said insulative plates to form a discrete layer thereupon. The configuration of these conductors and the lengths thereof conform to a predetermined pattern or configuration which has been found to be requisite to attaining a desired frequency characteristic in any of the antenna, preselector or oscillator stages. In addition to the conductors, such as 70, which are closely juxtaposed to the insulative plates, each resonator may include, where necessary, an additional conductor or conductors which may constitute metallic strips such as shown at 71, and which are raised above the insulative plate by means of insulative posts 72, 72'. In this manner the metallic strips overlie the insulative plates and avoid unwanted capacitance effects.

Electrically, the amount of inductance which is to determine the frequency acceptance of the individual resonator is determined by the electrical length of the conductors which form the coils of said resonators. These lengths, in accordance with the frequency requirements, may, as at ultra-high-frequencies, constitute a single turn type of coil or, at lower frequencies, constitute coils wherein the turns may be folded back on themselves to form a labyrinth type of coil configuration.

Figure 3:
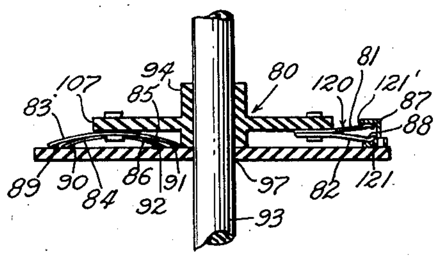
Fig. 3 is an elevational cross-sectional view of Fig. 2 taken along line 3—3 thereof as adapted to show the constructional and mechanical features of the contactor means used to vary the frequency of associated coil elements.

The lengths of the conductors which are effective in determining the frequency characteristics of the individual resonators are determined in a variable manner by means of a bridging type contactor assembly shown in Figs. 2, 3 and 6. The contactor assembly comprises a disc 80 to which are connected at determined radial positions individual contact-carrying arms such as denoted by reference characters 81—86. The contact-carrying arms are resilient in nature, being made and fabricated of a thin spring-like material and being of rhomboidal configuration whose ends are rounded off to carry the ball contacts shown as at 87—92. These ball contacts have been constructed so as to make individual contact with the separate inductors or conductors whose lengths have been chosen to encompass the determined frequency band width. As these contactors travel along the conductors, they insert varying amounts of inductance for introduction into the associated tank or resonator circuits of the separate tuning sections.

Each of the contactor assemblies comprises a disc 80 having a thickness 107 coupled to the shaft 93 in a tight and substantially fixed manner by means of a coupling collar or hub 94 so that when the shaft 93 rotates, each of the assemblies will rotate simultaneously therewith. The contact arms of each tuner section being supported by said assembly will therefore move in ganged unison upon rotational movement of the shaft. It is to be pointed out that the number or type of contact arms is determined by the configuration of the individual tuner sections according to the function of these individual sections, i. e. oscillator, preselector, etc. Thus, in section 18 the contactor assembly uses an additional brush 106 to make contact with a printed conductor such as that denoted by reference character 70.

The shaft 93 has a keyway or slot 95 formed therealong into which a key portion 96, integrally molded on the inner portion of the coupling collar, may snugly fit. The collar or hub 94 may thus slide along the shaft to its predetermined position thereon and thus be substantially locked thereat. The shaft 93 is adapted to penetrate each of the individual supporting insulative forms or plates by means of a central aperture 97 cut therethrough. For fine tuning, adjustment shaft 93 is circumscribed by an external sleeve 109 connected to the fine control 62 to move the same. Shaft 93, in circumscribing sleeve 109, is supported by bearings 109*a* and 93*a* situated, respectively, on plates 52 and 39 of the tuner.

In order to strengthen and support the collar portion of the assembly, a pair of strengthening ribs 98, 99 are integrally formed to the body portion 100 of the molded contactor assembly 80. The assembly has been novelly constructed with several features providing stability, strength and conformance to the shaft so as to couple each of the assemblies thereto without any deleterious effects of wobble and distortion. This is, of course, extremely important in obtaining constant tuning characteristics in the several tuner sections. Thus, in order to meet requirements of exact conformance and tolerance with respect to the shaft, a slot 101 has been cut into collar 94. The variation in tolerances may be compensated for in the adjustment of the collar by working through hemispherical channel 102. This channel is cut so that a strengthening land portion 103 is placed adjacent thereto with inner wall 104 of the aperture aiding to form a thick ring 105 on the collar or hub so that shaft 93 may be securely gripped on either side of the disc.

Figure 1:
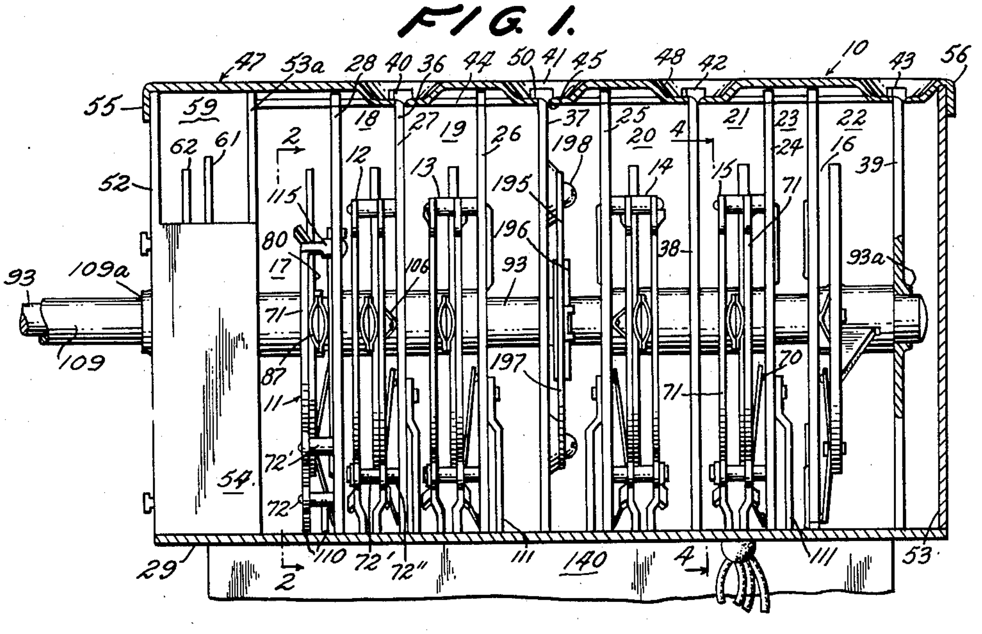
Figure 4:
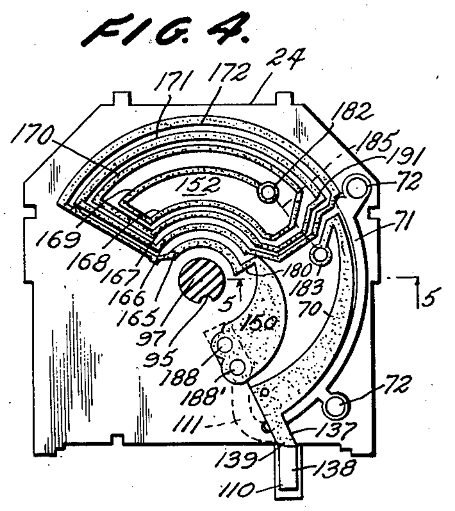

In the operation of the combined ultra-high-frequency (470–890 megacycles) and very-high-frequency tuner device (50–88; 174–216 megacycles) the tuning of the ultra-high bands is desired to be maintained separate from the tuning of the very-high-frequency bands. For this reason the tuners, wherever necessary, are provided with a pair of terminals 110 separately connected to the ultra-high-frequency bands and a pair of terminals 111 are provided for the very-high-frequency bands. Altogether, then, four terminals are provided to keep the bands separated as shown in Figs. 1, 2 and 4.

The terminals 110 are connected to the ultra-high-frequency tuning segments or conductor strips comprising a pair of silver coated metallic brass strips 71 having a physical construction of predetermined radial curvature, thickness, width and length correlated to the predetermined capacitance and inductive requirements electrically set for tuning continuously over a frequency range of 470–890 megacycles. Each of these ultra-high-frequency conductors 71 is placed on its associated insulative plate and has a radial curvature such that its length covers an arc of approximately 92° and has a width of approximately .125″ and a thickness of approximately .030″. Each strip, as shown in Figs. 1 and 5, is separated from the other by means of post sections 72, 72′ and 72″. In tuner section 17 the conductor is also seen to be supported above the insulative plate as by means of metal tongue or tongues 114 integrally connected at right angles to said conductor with a T-shaped portion 115 used to staple and tightly connect the same thereto.

To traverse the high-frequency conductors 71 and 71′ riding on arms 81 and 82, bifurcated wiper 120 makes electrical contact with the inner surface or surfaces 121, 121′ of the conductors 71, 71′. The individual arms 81 and 82 of the wipers are made of resilient, metal strips having an anchoring, rectangular section 123, a midsection 124 having a lesser diameter than said latter section and integrally connected thereto substantially in the same plane. A rectangular aperture 125 is cut to form connecting strips or fingers 130, 131 therein so as to aid in the resilience and adjusting of the degree of pressure made by the contacts riding in the within surfaces of the ultra-high-frequency conductor strips. The contacts are integrally formed in a semispherical fashion at the tips of a tapered end portion 126, whose sides come to a rounded tip. Portion 126 is integrally connected to strips 130 and 131 of the brush and may be bent with reference thereto in accordance with the amount of pressure desired on the inner surfaces of the conductors 71. Thus a novel compensating contact is provided giving a positive and noise-free operation of the contacts throughout the extent of the ultra-high-frequency conductors or inductances.

At the front tips of conductors 71, guideways or tails 131, integrally formed to each of the conductors, are formed. These tails 131 are bent at an angle away from the conductors so that the contact brushes may ride up and into the conductor surfaces of the ultra-high-frequency band. This is important since the contacts have been disengaged prior to their introduction onto the surfaces of the ultra-high-frequency band, and they must be imperceptibly, yet carefully, introduced thereto without causing improper electrical contact at the wrong time interval. It is to be noted, moreover, that the individual arms bearing the ultra-high-frequency contacts may have their rectangular portions 123 flattened together and staked to the contactor assembly by means of rivets 133, 133′.

Terminals 110 for the conductors are integrally formed of conductors 71 and are contoured in two sections, one section 137 being bent substantially at 90° thereto and the other end section 138 connected to section 137 at an angle therewith bent at a slight lower level by means of rise junction 139. As disclosed, the amount of inductance in the tuner sections operative for ultra-high-frequency with the associated electrical circuitry 140 is determined by the traversal position along the conductor 71 of bridging contactor 120.

In the subject ultra-high, very-high-frequency tuner, the latter section of each tuning element comprises an embossed arcuate pattern of inductance of specific tapered or convoluted configuration which permits tuning the low and high frequency portions of the spectrum including 50–88, and 174–216 megacycles. The patterns, such as tapered conductors 150, 70 and 151, and labyrinth conductor coils 152 and 153, may be mounted or printed on the insulative forms or plates of the tuner sections to tightly and closely adhere thereto. The patterns developed on the individual plates of the tuner section are constructed in accordance with the frequency requirements of the individual sections.

Thus, the oscillator section may have a number of turns varying from the "R. F." section. Each pattern sets up the limits for the amount of inductance which is capable of being introduced into the resonator. For example, Fig. 4 shows that more inductance may be introduced by the patterns shown therein than that shown in Fig. 2. Each labyrinth coil comprises a multiplicity of concentric arc segments shown by reference numerals 160—164 in Fig. 2, and by numerals 165—172 in Fig. 4. The ends of these arcs may be connected by a straight conductor strip placed substantially vertically thereto so as to form an over-all continuous conductive loop having an "open-fan" configuration. One end of the coil may be brought out either to termini, such as 181, 182, or joined to form a continuous link such as between conductor 70 and coil 152 as by means of a jumper or conductor 185 connected between the terminus 182 and terminus 183. When this latter condition occurs, electrical terminal 111 is in turn connected to strip 150 by means of rivets 188 and 188'.

In Figs. 2 and 4 conductors 160 and 163 are shown as being connected by linear strips 173, 174 so as to form continuous loops. It is also to be noted that strip 174 may be configured in a stepped fashion so as to include offset portions such as 175 and 176 connected by steps 177 and 178. It is to be noted also that tapered section 150 may be connected to its associated concentric conductor 165 by means of step portion 180.

Thus the patterns described provide continuous reactance tuning over several frequency bands of a finite extent with a minimum angular or translational contact displacement between these frequency bands, while at the same time offering a relatively small angular contact displacement within each band. The labyrinth is of variable length as placed within a relatively small space and has a relatively large rotation of maximum to minimum inductance within no more than one-third of a complete rotation of a tuning shaft with its associated contractor assembly.

Tuning through the very-high-frequency bands encompassed by the conductors of the labyrinth coil and its associated tapered conductors is provided by contactor assembly 80. Nested arms 83, 84, 85 and 86 thereof are rotated by the assembly in a counter-clockwise manner so as to traverse the aforesaid coil and conductors. For example, in Fig. 4 conductor arcs 165 and 172 and arcs 166 and 171 are traversed by the contactor arms described above. The contacts on these contactor arms progressively short out more and more of external arcs 165 and 172 and, in like fashion, internal arcs 166 and 171 as the tuning proceeds. In the operation of these tuning elements, the inductance arcs subtended between reference numerals 182 and 191 act as a fixed or lumped inductance and/or jumper which is necessary to tune down from 174 megacycles to 88 megacycles; that is, the gap which exists between the frequencies of the low and high portions of the high-frequency spectrum of the tuner.

As the tuning operation proceeds, arms 83 and 85 will not make contact with the inductors 150 and 70 which are the inductors necessary to tune the high portion of the very high-frequency spectrum of the combined tuner. Tuning these inductances will be accomplished by the shorting contactor consisting of arms 84 and 85 of the assembly 80. The amount of inductance introduced into the very-high-frequency spectrum of the tuner may be taken off as by means of terminals connected to arcs 150 and 70.

Since the ultra-high-frequency and the very-high-frequency circuits utilize and work into a common mixer stage, a single pole double throw wafer type switch 195 (Fig. 1) is provided to couple the stages separately into this mixer section. The rotor 196 of the switch 195 is coupled to shaft 93 and turns therewith while the insulative stator disc 197 which supports the terminals of the double throw switch is mounted and fixed to a shield 37 by means of posts 198. Thus, as desired, either the ultra-high-frequency or the very-high-frequency section of the tuner is discriminately coupled to the common mixer stage of the tuner.

The combined ultra-high-very-high frequency tuner shown in Figs. 1–6, and as hereinafter electrically described with reference to Fig. 8 et seq., uses the placement of the separate bands of these two spectrums side by side on the insulative form or plate. However, the inductances or coils are adapted to be placed on the reverse sides, opposite each other, on said insulative plate for continuous tuning over the ultra-high and very-high-frequency bands.

For example, Fig. 7 illustrates a cross-sectional view of one type of such construction. Here a flat, thin, molded coil base form 200 is shown as having opposing sides 201 and 202. The ultra-high-frequency portion of the tuner comprises a dual line spiral type of coil 203 including a pair of parallel, frequency-shaped conductors 204 and 205 mounted in an upright manner within grooves formed in the base 206. Coil 203 is tuned by means of a shorting contactor brush 207 connected to a shaft coupler 208 circumscribing shaft 215 as by means of contactor arm 209.

On the opposite side 201 of the coil form a spiral coil 210 is provided including a multiplicity of conductors 211, 211' formed in the shape of a spiral and also mounted in a substantially upright manner within grooves formed in the base 212. The coil 210 is adapted to be tuned by means of conductor arms 213, 214, coupled to collar 216 on shaft 250. Thus it is that all the contact arms are capable of being ganged and tracked in unison.

Electrically the tuner can be used as a four terminal network, the contactors serving as switching means, automatically as the shaft is rotated. Thus, starting from a stop position and turning counter-clockwise, the tuner turns line shorting contactor 209 from minimum inductance to maximum inductance position on the ultra-high range, tuning from 890 megacycles to 470 megacycles; then this line shorting contactor is raised up or disengaged by engagement with a spiral cam surface provided on the molded coil form and is kept up during further shaft rotation required for the very-high-frequency tuning portion. Further counter-clockwise tuning varies the amount of inductance of the tuners of the spiral very-high-frequency coil to tune the frequency range 216 to 174 megacycles "H" band, at which point its associated contactor is raised up by an attached nylon button engaging the inner turn of the spiral coil wire, leaving only the other very-high-frequency contactor, connecting the spiral coil to its low end collector ring. Further counter-clockwise rotation varies the inductance of the spiral coil to tune the low band 88 to 54 megacycles.

The oscillator section of this tuner, which must operate approximately 42 megacycles above the "R. F." sections frequency, is arranged with somewhat wider ribbons to reduce inductance and increase its frequency on ultra-high-frequency and is provided with a shading ring 224 molded into the coil form in close spaced relationship to the back side of the spiral coil to reduce the spiral coil's inductance and, hence, increase its frequency for oscillator purposes on both the "H" and "L" very-high-frequency bands. If desired, the separate patterns may be embossed in either side of the plate in a manner similar to that shown in other figures described above.

In the description above, and in that which follows, several cumbersome expressions are commonly abbreviated by those skilled in the art. These abbreviations make for greater fluidity and readability, and accordingly they shall be defined herein so that their use may be fully understood:

The abbreviation "UHF" or "U" is taken to mean "ultra-high-frequency"; the term "VHF" or "V" is taken to mean "very-high-frequency." The terms "U" and "H" are taken to mean, respectively, "ultra" and "high," whereby the term "UVH" or "UV" tuner is taken to mean a combination tuner traversing ultra-high and very-high-frequency spectrums. The term "mc." is taken to mean megacycles; the term "mfd." is taken to mean "microfarad"; the term "mmf." is taken to mean "picofarad"; the term "h." is taken to mean "henry"; the term "mh." is taken to mean "millihenry." The term "R. F." is taken to mean "radio-frequency"; the term "osc." is taken to mean "oscillator." The term "Q" is taken to mean the quality rating of the resonant circuit as being equal to the inductance reactance divided by the resistance of the said circuit; the term "$k$" is taken to mean "coupling factor" or "coupling coefficient." Tube designations such as "6BQ7" are taken to be the manufacturer's designation for a special type of tube having certain specific characteristics making the said tube adaptable for use in the electrical circuit. The term "jumper" is taken to mean an electrical connecting bar or strip; the term "jump" is taken to mean a frequency gap covered and situated between two limiting frequencies. The term "H" is taken to mean the high-frequency portion of the "UHF" band, that is, the range covering the frequency from 170 mcs. to 260 mcs. The term "L" is taken to mean low portion of the "VHF" band, that is, the frequency range corresponding to the frequencies from 54–88 megacycles. The term "suck-out" is taken to mean false resonance points. The term "db" is taken to mean "decibels."

Generally speaking, the ultra-high-frequency signal (417–890 mcs.) is accepted by the "UHF" antenna having an impedance of approximately 300 ohms. The signal is routed to the cathode of the "R. F." amplifier "6AN4." The signal is amplified by the tube and fed out from the plate through an isolating capacitor to the first tuned circuit in the band pass tuning section. Passing from the band pass tuning section the signal is routed to the cathode of the mixer tube "6AN4." Here the incoming signal is mixed with the signal from the oscillator "6AF4" tube and stepped down to give an intermediate frequency signal of approximately 43 mcs.

The signal accepted by the "VHF" antenna having an impedance of 300 ohms is brought to the "VH" antenna section. This section is tuned very broadly. This section is then magnetically coupled to the next section at an optimum factor. The signal is then routed to the grid of the first "R. F." amplifier stage "6BQ7." From the plate of the "6BQ7" the signal is fed to the first stage of the band pass section and then to the second stage thereof. The signal is then routed to the cathode of the mixer tube "6AN4," where with the "UHF" signal its frequency is mixed with the injected frequency of the oscillator to give an intermediate frequency output of approximately 43 mcs. A single pole double throw switch is used to discriminately route the signals from the either the "UHF" or the "VHF" acceptance stages to the aforesaid mixer tube.

In the electrical operation of the tuner as illustrated by the drawing of Figs. 8, 10 and 11, the "V" band operation will be described first. The "V" band antenna 301 presents a nominal impedance of 300 ohms to the first tuned circuit 302 comprising transformers 302′, 303. This arrangement leads to a very low value of "Q" for the input or primary circuit, starting at about $Q=1.4$ on channel #2 (lowest channel) and rising to $Q=5.5$ on channel #13 (highest channel) of the spectrum. The two sections of the tuner are used to create an over-coupled input circuit 302 coupled physically by proximity of the printed wafers constituting each section. The total tuning capacitance required for these sections is of the order of 13 $\mu\mu$f. The secondary circuit has a "Q" of approximately 25 so that the effective overall "$Q'$" of the input is somewhat less than 3. A value of "$k$" at least as great as $1/Q'=35\%$ is required for optimum transfer of energy. The band width of the input is quite broad, about 20 mcs. and is relatively uniform from channels #2 to #13.

The input circuit band width is determined by the so-called transitional coupling, where "$k$" is arranged to be approximately $1/\sqrt{2Q}$. Since "Q" increases with frequency, "$k$" must decrease to maintain constant band width. By arrangement of circuits 302′ and 303 in proximity, "$k$" will normally decrease as the frequency increases because the area and coupling field of the labyrinth of the tuner designated as 350, used as a tuning element shown in Fig. 10, decreases with frequency. On the high channels of the "V"-band this area is sharply reduced, being enclosed by the high-band element 351, the ground element 352 and the contactor arms 357. This arrangement automatically compensates for the sudden increase in "Q" in going from channel #6 to #7. Thus, the shape of the printed pattern in conjunction with the proximity of the tuning elements constitutes a device to maintain substantially the proper value of transitional coupling for constant bandwidth.

The tuning of the "V"-band proceeds by the rotation of the contacts 353 and 354 in a counter-clockwise direction from #2 to #6. These contacts short-out progressively greater portions of the two external arms 358—358′ and 359—359′ of the labyrinth as the tuning proceeds, but since they are not connected to one another at all, nor to the internal arms 355, 356, this internal arm acts as a fixed or "jump" inductor during the tuning of the low-band. On channel #6, just before jumping to channel #7, the tuning inductance consists of arc 352, contactor brush 353, connection 360, brush 354, arcs 356 and 355, tapered conductor 351, and terminal 364. After jumping to channel #7, the contactor brush 353 breaks contact. Brush 357 (solid line) is the same as brush 354, but in the high position and thus acts as the high-band tuning mechanism, completing the circuit between tapered conductor 352 and 351 which are on the same radius with the inner element of the low-band labyrinth. The "V"-band terminals, high and low, are always 364 and 365, two of the total of four terminal outlets on the "R. F." sections. Alignment on channel #2 is by the variable capacitors 320, and on channel #13 by the end inductors 321. It is to be noted that the first input circuit is so broad that it requires no alignment.

The "R. F." amplifier is a double triode circuit on the "V"-band. The first half of the "R. F." tube 304 is operated as a grounded cathode triode. The grid connection is tapped-down on the second tuned circuit by approximately 65% by virtue of the grid cathode capacitance 306 (about 5 $\mu\mu$f.) and the coupling capacitor 305. This is to prevent transit-time loading of the "6BQ7" at approximately 200 mcs. from seriously affecting the input bandwidth. The plate load of 304 is the cathode impedance of the second triode 307 operated as grounded grid, and is the reciprocal of the mutual conductance of this tube. The gain of a triode is a little less than its mutual conductance times the load, or less than unity in this case, so neutralization is not required. The interstage reactances 308 and 309 are broadly tuned out for the high-band by the choke coil 310 resonating at about 200 mcs. The very poor "Q" of the cathode-input capacitor 309 due to heater emission and high input conductance makes this circuit tune broadly across the "H"-band.

The output of the cascode circuit is coupled to a grounded-grid mixer 314 by means of the over-coupled circuits 311 and 312, which are physically "R. F." tuning elements. Here, coupling is not by proximity but is physical by virtue of the capacitors 313 and 315. These circuits are more than transitionally coupled to provide double peaks about 5 mcs. apart on channel #2, and 8 or 10 mcs. on channel #13. When the coupling is greater than transitional, the peak separation depends on the difference between "$k$" and $1/Q^2$, so that unless "$k$" is varied as the tuning changes, the bandwidth will get quite narrow at low-frequency tuning points, due to decrease in "Q"

at low frequencies. For this reason, additional coupling is provided on the low-band to increase the bandwidth, by virtue of capacitor 315 which is connected directly between terminals 355 of the two tuning elements at the top-end of the jump-coil between high-and-low-bands (Fig. 10). This arrangement produces greater coupling as the inductance is increased on the low-band, and it increases the bandwidth in such a way as to hold it substantially constant with tuning.

The mixer 314 is cathode-fed by the "R. F." and oscillator signals. The input impedance, however, of this grounded-grid tube is several times greater than that of the cascode tube 307 by virtue of the low value of operating mutual-conductance due to relatively high bias from resistor 316. The mixer choke 317, having a value of 33 μh. tunes out the cathode reactance below the low-band so that this will be substantially capacitive in the operating range to increase the impedance step-down due to capacitive-transformer action between capacitors 318 and 319, so that the proper selectivity of the mixer coupling circuit can be achieved in spite of the variety of losses being coupled in to this point at various frequencies.

The oscillator 376 tuning element is also a four-terminal device, but is a different pattern from the "R. F." as shown in Fig. 11. Most of the "jump" inductance is external to the terminal 368 as a physical coil 375 which is located on the back side of the physical coil form. This is a necessary condition to "break-up" a long lead from the internal terminal 368 on "V"-band operation. Otherwise, this lead will resonate at approximately 1000 mcs. and produce a "suck-out" or false resonance on the "U"-band. A small portion of the "jump" inductance forms part of the physical pattern between conductor limits 368 and 369. The contactor brushes 371 and 372 tune the low-band oscillator circuit from channel #2 to #6. At this point contactor brush 372 disconnects the "jump" inductance and contactor brush 371 continues the tuning operation on the high-band by contact with printed elements 370 and 373 which are on the same radius with the outer elements of the low-band labyrinth as seen in Fig. 11.

The oscillating circuit is connected between grid and plate of tube 376 with capacitive "tap-in" of the cathode to give what is generally known as a Colpitts type oscillator circuit. On the low-band, grid coupling to the tuned circuit is by the capacitor 377 and on the high-band by capacitor 378. Capacitor 377 is used to align the oscillator on channel #2 and 378 on channel #13. The end inductor 379 is for alignment on channel #13. The cathode and heaters are "floated" between grid and plate by the chokes 380 so that the "ratio" between internal capacitances from cathode will not be upset by distributed capacitances of tuning and circuit elements to ground. Capacitor 381 is added to achieve the correct compromise of "ratio" for all bands and its value is critical, needing to be determined experimentally for any circuit layout because of the large number of unknown distributed parameters 382—390.

As has been stated, the "U"-band input and tuning are entirely separate from the "V"-band. For this reason, two pairs of terminals are provided on each tuner section to give a total of four terminals. Referring to Fig. 8, the "U"-band antenna 324 presents a nominal impedance of 300 ohms to the first tuned circuit 331 by means of the coupling capacitors 325 and 325'. This arrangement makes the coupling capacitors act as a low-"Q" shunt on the tuned circuit. The reactance of the circuit element is low, also, so that the overall "Q" is probably in the nature of 6 at mid-band and the overall tuned-circuit impedance is of the order of 400 ohms. Input admittance measurements on the "6AN4" "R. F." amplifier 326 shows that the resistance component is approximately 80 ohms. The impedance loss, i. e. power loss, of the input circuit is probably 80/300, and the voltage loss would then be approximately 6 db. Insertion losses are negligible, however, due to the very heavy external loading of the antenna and cathode. Excessive voltage-loss has been further avoided by tapping-down from only half of the tuned-circuit impedance by means of capacitors 329 and 330.

The "R. F." amplifier section 326 is a grounded grid triode working into an over-coupled impedance consisting of two resonant tuning sections 332 and 333 coupled by capacitive reactance 334. The nominal midband "Q" of each circuit is probably in the nature of 50. The transitional and critical, i. e. optimum gain, coupling coincide when the "Q's" are equal, but "*k*" is adjusted larger than 1/Q so that two peaks occur. Normally, the bandwidth would remain constant over the "U"-band, but there is a loss in "Q" at the top of the "U"-band due to additional transit-time loading so the overall bandwidth increase from 15 to approximately 30 mcs. between low and high ends of the "U"-band.

The "U"-band contactor brush 363, shown in Fig. 10, is tied to the high-band tuning strip 351 to prevent "suck-out" or false resonance at "UHF." At the cross-over from "V"-to-"U"-tuning, although the switch 344 disconnects B+ from the "V"-band tuner, there is a brief interval where tuning sectional 332 will have "D. C." voltage on it. For this reason, blocking capacitors 335 and 343 are inserted to isolate 332 from ground.

The "U"-band contactor brush 363 leads the "V"-band contactor brushes 353, 354 by approximately 90°. Thus, as brush 354 slides off of inductance 351, then brush 363 contacts inductance 351 and short-circuits a pair of overhead lines 361, 362 to tune the "U"-band. In the oscillator section (Fig. 11) there is no printed strip in a position similar to that of strip 351, but one of the "overhead" lines 373 is placed flat on the insulative plate and serves in lieu thereof. Contactor brush 371 picks line 373 up for high-band tuning, and 90° later the contactor brush 347 short-circuits both lines 373 and 374 for "U"-band oscillator tuning.

Alignment on channel #84 of the "UHF" band is by the end-inductors 327 and 327' and on channel #14 by the trimmer capacitors 328 and 378. The resonant impedances on the "U"-band are all center-tapped at 335, 341, 342 to secure a better match from the high-"Q" circuits to the low-impedance input and output of known types of vacuum tubes, operating in the "U"-band.

The mixer is coupled to the "V"-band, "U"-band and oscillator stages by capacitors 318, 323 and 322. This coupling has been arranged to be mutually non-interfering, for the frequency ranges involved, without the use of switches which would deteriorate performance by adding stray constants and undesirable "suck-outs."

The filaments or heater arrangement for the separate tubes are shown in Fig. 9. Feedthroughs 345 and isolators 346 are also provided between "U" and "V" sections to minimize undesirable couplings. A broad-band intermediate-frequency transformer 348 provides the plate load for the mixer 314 and supplies 43 mc. signals to the "I. F." terminals 349 and 349' for application to associated "I. F." amplifiers.

The present invention of a combined ultra-high and very-high-frequency tuning device operative over the frequency bands existing between 50 mcs.–88 mcs., 174–216 mcs., and between 470–800 mcs. is intended to be merely illustrative of the applicant's invention and does not intend to restrict the scope thereof.

What is claimed is:

1. A continuous very-high-frequency and ultra-high-frequency television tuning device comprising an ultra-high-frequency section and a very-high-frequency section, each of said sections individually including stages of radio-frequency, a mixer stage and an oscillator stage, said stages having as an integral component thereof embossed conductor patterns as well as overlying metal strips for tuning said frequencies placed on a flat coil form, said patterns and strips having a configuration defining the inductive parameters necessary to tune each of the frequency sections of said tuning device, contactor assemblies connected to a common shaft in each stage of said section adapted to unitarily wipe said patterns on rotation of said shaft, said ultra-high-frequency section adapted to receive frequencies between 417 and 890 megacyles on an ultra-high-frequency antenna, said latter signals being routed to the cathode of an amplifier in a radio-frequency stage in said ultra-high frequency section, a second amplifier including ultra-high-frequency tunable strips connected to said first radio frequency in said ultra-high frequency section stage, said stages being connected to tuned circuits in a band pass section through a switch, blocking capacitors connected between ground potential and said strips to prevent D. C. voltage thereon when said switch is connected to said band pass section, a mixer tube for said mixer stage, an oscillator tube operative to deliver a determined frequency output, said signals from said band pass section and said oscillator being individually fed to said mixer tube whereupon output is obtained therefrom of approximately 43 megacycles for said associated intermediate frequency stages.

2. A continuous very-high-frequency and ultra-high-frequency television tuning device comprising an ultra-high-frequency section and a very-high-frequency section, each of said sections individually including stages of radio-frequency, a mixer stage and an oscillator stage, said stages having as an integral component thereof embossed conductor patterns and ultra-high-frequency resonant impedance strips placed on a flat coil form, said patterns and strips having a configuration defining the inductive parameters necessary to tune each of the frequency sections of said tuning device, said strips being center tapped to ground to secure better impedance matching between them and the associated tubes connected thereto, contactor assemblies connected to a common shaft in each stage of said section adapted to unitarily wipe said patterns on rotation of said shaft, said ultra-high-frequency section adapted to receive frequencies between 417 and 890 megacycles on an ultra-high frequency antenna, said latter signals being routed to the cathode of the amplifier of a radio-frequency stage, the amplifier signal output from said amplifier being eventually passed to a tuned circuit in a band pass section, a mixer tube in said mixer stage, an oscillator tube operative to deliver a determined frequency output, said signals from said band pass section and said oscillator being individually fed to said mixer tube whereupon output is obtained therefrom of approximately 43 megacycles for said associated intermediate frequency stages.

References Cited in the file of this patent

UNITED STATES PATENTS

| | | |
|---|---|---|
| 1,850,831 | Elliot | Mar. 22, 1932 |
| 1,869,870 | Stevenson | Aug. 2, 1932 |
| 2,024,816 | Carlson et al. | Dec. 17, 1935 |
| 2,025,128 | Rust | Dec. 24, 1935 |
| 2,107,393 | Schlesinger | Feb. 8, 1938 |
| 2,513,392 | Aust | July 4, 1950 |
| 2,513,485 | Herrick | July 4, 1950 |
| 2,530,836 | Mumford | Nov. 21, 1950 |
| 2,543,560 | Thias | Feb. 27, 1951 |
| 2,614,212 | Laughlin | Oct. 14, 1952 |
| 2,627,579 | Wasmansdorff | Feb. 3, 1953 |
| 2,637,808 | Herrick | May 5, 1953 |
| 2,652,487 | Bussard | Sept. 15, 1953 |
| 2,695,963 | Thias | Nov. 30, 1954 |

OTHER REFERENCES

Publication: QST, September 1951, pages 41, 42, 43.